(12) United States Patent
Jia et al.

(10) Patent No.: US 6,728,005 B1
(45) Date of Patent: Apr. 27, 2004

(54) METHOD FOR AUTOMATIC REMOVAL OF IMAGE ARTIFACTS

(75) Inventors: Charles Chi Jia, San Diego, CA (US); Curtis Young, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/393,721

(22) Filed: Sep. 10, 1999

(51) Int. Cl.[7] .................. H04N 1/409; H04N 1/047; G06T 5/00; G06T 5/50; G06T 7/00
(52) U.S. Cl. .................. 358/3.26; 358/488; 358/453; 382/275; 382/282; 382/291; 382/217
(58) Field of Search ................ 382/275, 282, 382/291, 217, 218, 286, 289, 254; 358/3.26, 487, 488, 463, 471, 474, 453

(56) References Cited

U.S. PATENT DOCUMENTS

| | | | | |
|---|---|---|---|---|
| 5,729,634 A | * | 3/1998 | Robinson | 382/254 |
| 5,974,199 A | * | 10/1999 | Lee et al. | 382/289 |
| 6,271,935 B1 | * | 8/2001 | Cook | 358/1.9 |
| 6,466,340 B1 | * | 10/2002 | Washio | 358/488 |

* cited by examiner

*Primary Examiner*—Scott Rogers

(57) ABSTRACT

A method for automatic removal of image artifacts includes the steps of comparing scanned image data pertaining to regions where it is possible for image artifacts to be present to idealized image artifact data, determining whether image artifacts or partial image artifacts are present in the known regions, excluding such regions or portions of them as appropriate from a scannable area, and generating an image from the elements of the scanned image data pertaining only to the portions of the scannable area for which no image artifacts are determined to be present.

39 Claims, 8 Drawing Sheets

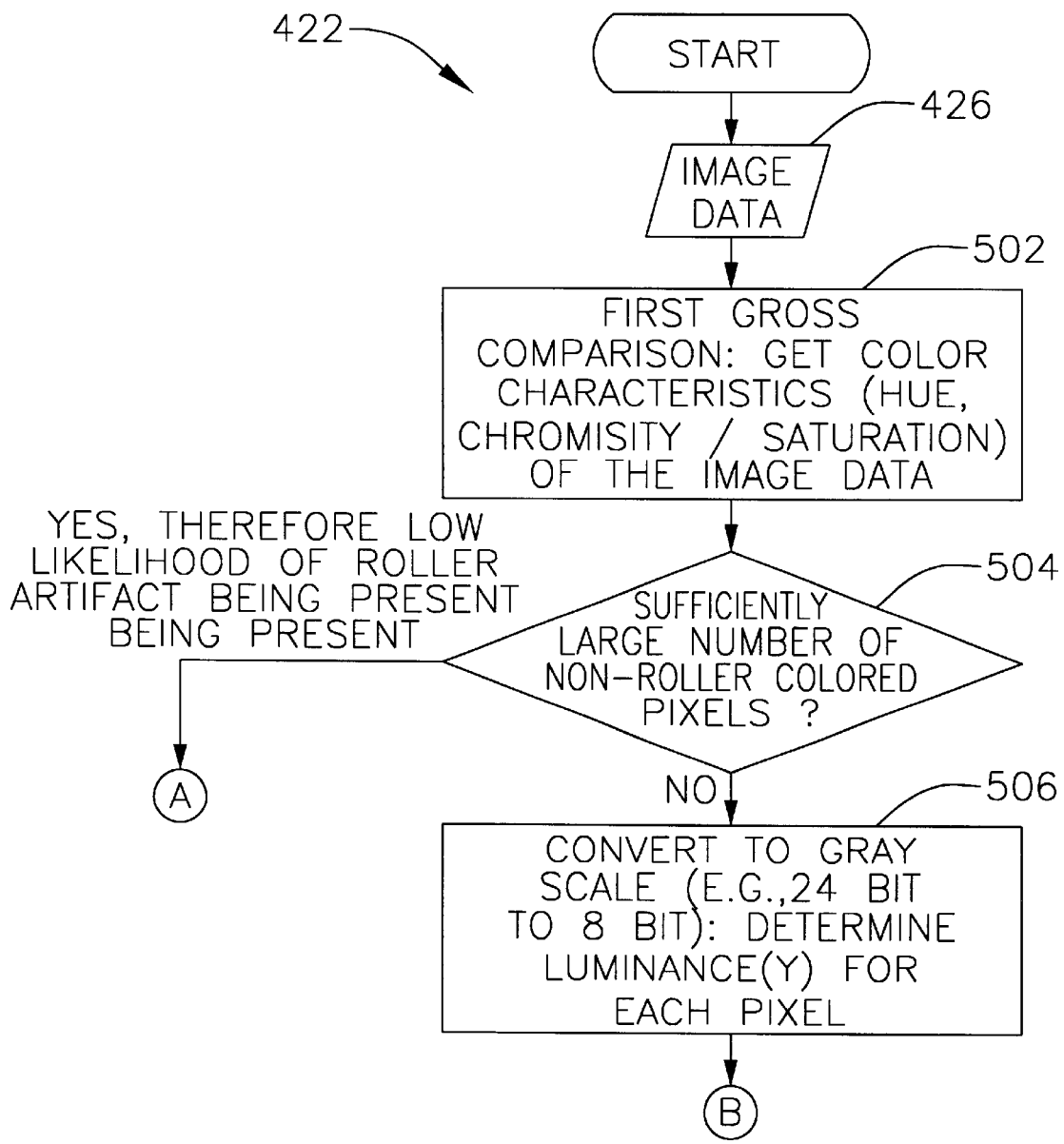

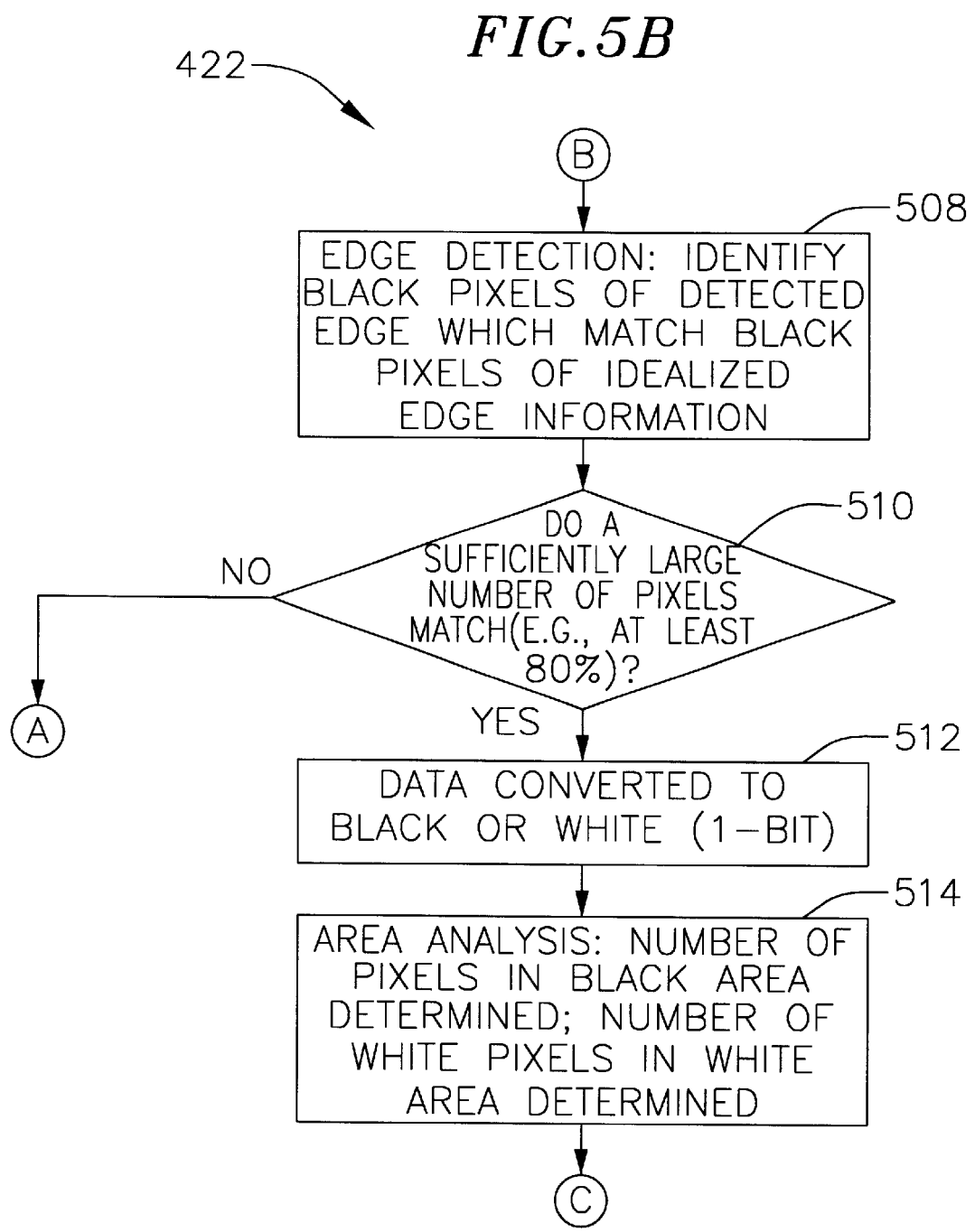

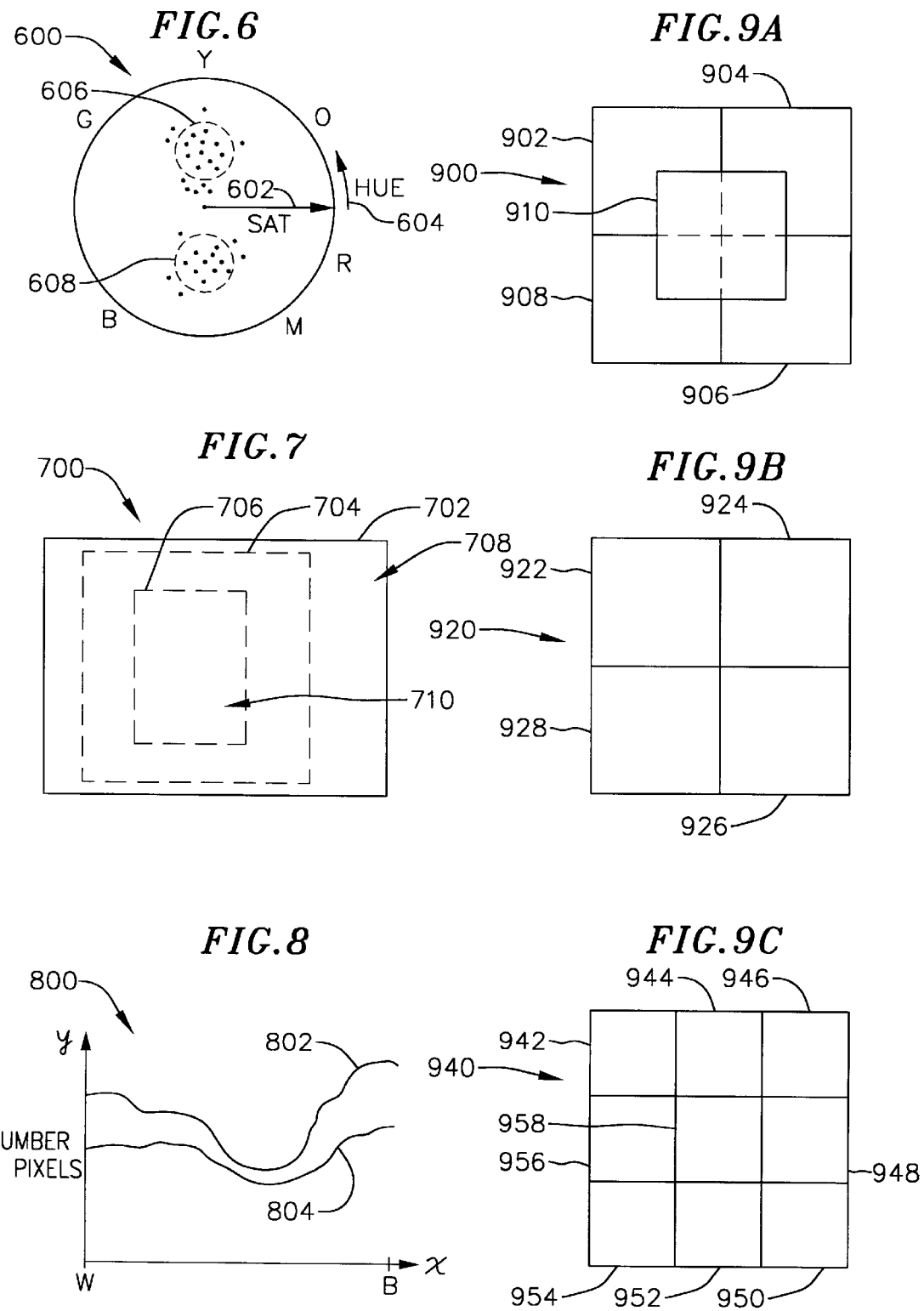

METHOD FOR AUTOMATIC REMOVAL OF IMAGE ARTIFACTS

BACKGROUND OF THE INVENTIONS

1. Field of Inventions

The present invention relates generally to a method for automatic removal of image artifacts and, more specifically, to a method for detecting image artifacts within known regions of a scannable area and directing a processor to exclude the regions within which image artifacts are detected from the scannable area.

2. Description of the Related Art

Some flat bed scanners employ an Automatic Document Feeder (hereinafter "ADF") which, generally, is positioned above a scannable area of the scanner. Typically, the ADF includes one or several rollers or belts positioned above an edge portion of the scannable area. The rollers or belts advance an object to be scanned over the scannable area and then withdraw the object after it has been scanned.

In some instances, an object to be scanned is smaller than the scannable area and is placed by hand over the scannable area. Depending upon its placement over the scannable area, the object may not be positioned at the edge beneath the rollers. When this happens, the resulting image will include a whole or partial image of the roller, or "roller artifact". Other image artifacts such as "margin or edge artifacts" and "fiducial marker artifacts" can also be present depending upon the size of the scanned object and its position over the scannable area. Additionally, a "document holder artifact" (from a document holder) can be present in some circumstances. Image artifacts can also appear when a transparent or translucent object such as a transparency is scanned.

Thus, a need exists for a method of automatically detecting such image artifacts and eliminating them from scanned images.

SUMMARY OF THE INVENTIONS

A method for automatic removal of image artifacts in accordance with one embodiment of the present invention employs first a profile-based processing step and then a sector-based processing step. The profile-based processing step employs idealized image artifact profile information to identify known image artifacts within regions of a scannable area where it is possible for the image artifacts to be present. The sector-based processing step is a similar but more geographically focused analysis which identifies partial image artifacts within the aforementioned known regions. Regions and/or sectors within which image artifacts (whole or partial) are identified are excluded from the scannable area.

A method for automatic removal of image artifacts in accordance with another embodiment of the present invention includes the steps of: scanning a scannable area to provide image data, the scannable area including at least one region where it is possible for image artifacts to be present; processing portions of the image data corresponding to the at least one region to determine whether an image artifact is present in the at least one region; and excluding from the scannable area regions where an image artifact is determined to be present.

A method for automatic removal of image artifacts in accordance with another embodiment of the present invention includes the steps of: receiving image data pertaining to a known region of a scannable area where an image artifact may be present; processing the image data to determine whether the image artifact is present within the known region; and when an image artifact is present in the known region, controlling a processor to exclude the known region from the scannable area.

A method for automatic removal of image artifacts in accordance with another embodiment of the present invention includes the steps of: receiving image data pertaining to a scannable area; processing the image data to determine whether image artifacts are present within predetermined regions within the scannable area; and generating an image from the image data pertaining to regions of the scannable area for which no image artifacts are determined to be present.

The above described and many other features and attendant advantages of the present inventions will become apparent as the inventions become better understood by reference to the following detailed description when considered in conjunction with the accompanying drawings.

BRIEF DESCRIPTION OF THE DRAWINGS

Detailed description of preferred embodiments of the inventions will be made with reference to the accompanying drawings.

FIGS. 5A–5C are flowcharts showing the profile-based roller removal process of FIG. 4 in greater detail;

FIG. 6 conceptually illustrates a first gross comparison step of the profile-based roller removal process of FIG. 5A;

FIG. 7 conceptually illustrates an area analysis step of the profile-based roller removal process of FIG. 5B;

FIG. 8 conceptually illustrates a distribution analysis step of the profile-based roller removal process of FIG. 5C;

FIG. 9A illustrates an exemplary preferred sector configuration according to the sector-based roller removal process of FIG. 4; and FIGS. 9B and 9C illustrate alternative sector configurations for the sector-based roller removal process of FIG. 4.

DETAILED DESCRIPTION OF THE PREFERRED EMBODIMENTS

The following is a detailed description of the best presently known mode of carrying out the invention. This description is not to be taken in a limiting sense, but is made merely for the purpose of illustrating the general principles of the inventions.

Figure 1:
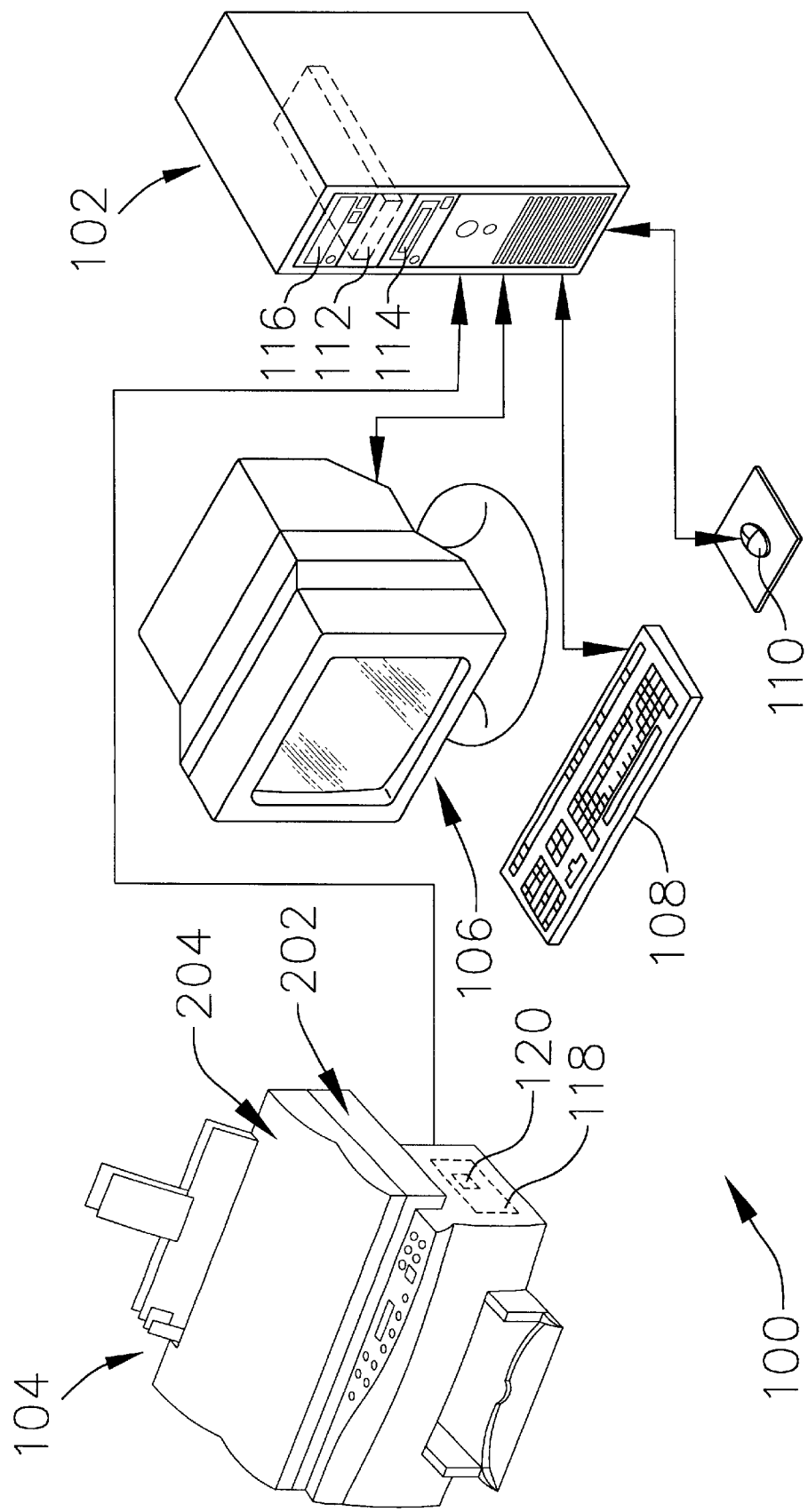
FIG. 1 is a perspective view of a personal computer and a flat bed scanner with an ADF, the system being configured to employ the principals of the present invention.

FIG. 1 shows a system 100 configured to employ the principals of the present invention. The system 100 includes a computer 102, scanner 104, monitor 106 and various user-input devices such as a keyboard 108 and a mouse 110 functionally interconnected as shown. The computer 102 comprises, for example, a personal computer ("PC") with a hard drive 112 (shown in phantom lines), a disk drive 114 and a CD-ROM drive 116. An exemplary preferred scanner 104 comprises an "All-In-One" product such as the HP OfficeJet R Series (R60/80) which provides integrated printing, scanning and copying functions, all in color. The scanner 104 includes a circuit card 118 with firmware 120 (both shown in phantom lines).

According to the present invention, software employed by an exemplary preferred method for automatic removal of image artifacts is stored in the hard drive 112. Data pertaining to the scanner 104 is stored in the firmware 120. The computer 102 executes the software, accessing data from the firmware 120 as needed. It should be understood, of course, that the scope of the present invention also includes software and data storage configurations other than the one just described.

Figure 2:
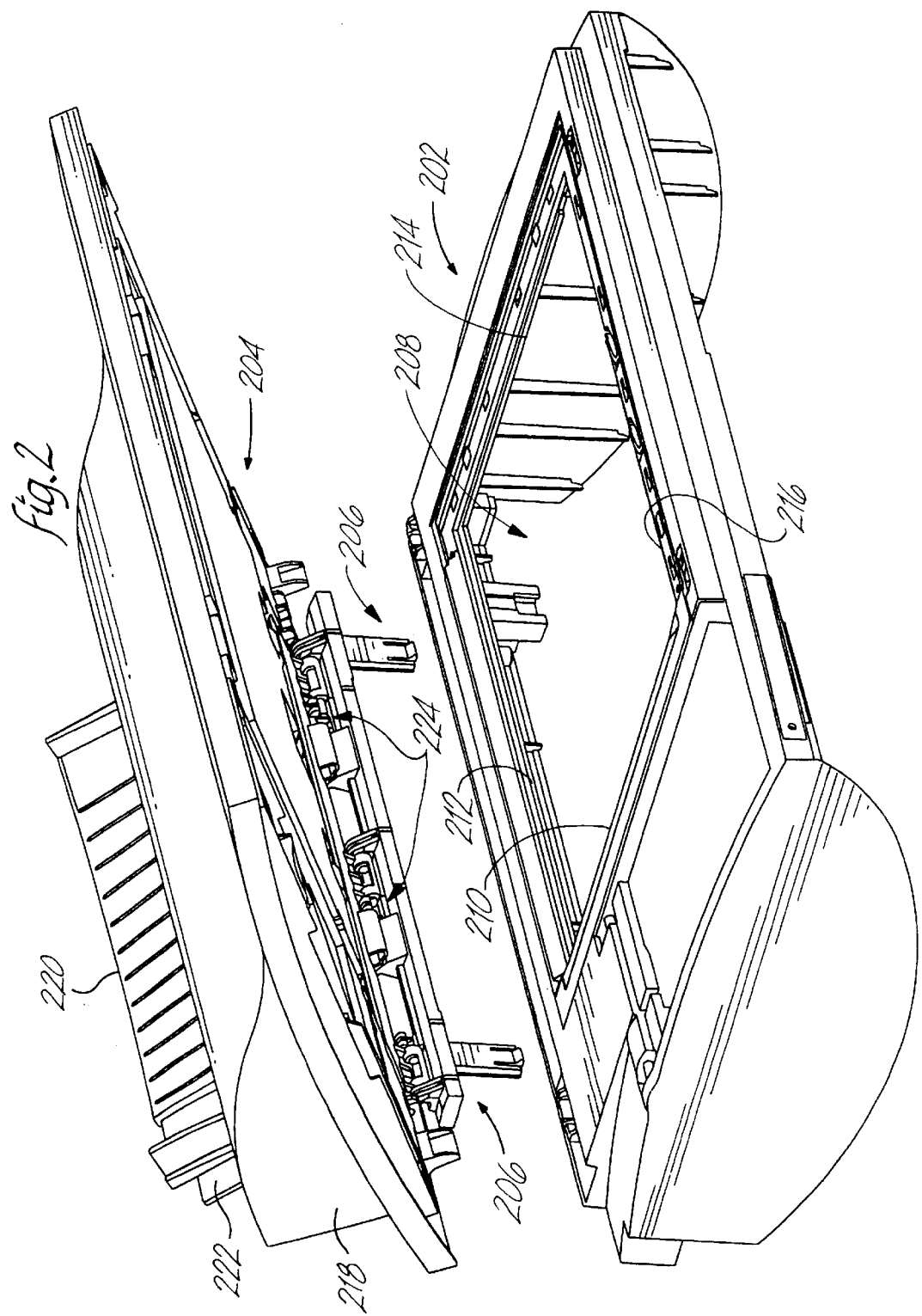
FIG. 2 is a enlarged perspective view of the ADF of FIG. 1 shown with a flat bed input device of the scanner of FIG. 1.

Referring to FIGS. 1 and 2, an exemplary preferred scanner 104 includes a flat bed input device 202 and an ADF 204 which are pivotally interconnected by quick release attachment hinges 206. The input device 202 includes a scannable area 208 positioned within a boundary defined by a left edge 210, a back edge 212, a right edge 214 and a front edge 216. The ADF 204 includes a top case 218, a document input tray 220, a document output tray 222 and rollers 224 configured as shown. When the ADF 204 is closed over the flat bed input device 202, the rollers 224 are positioned over the scannable area 208 adjacent to the back edge 212.

Figure 3:
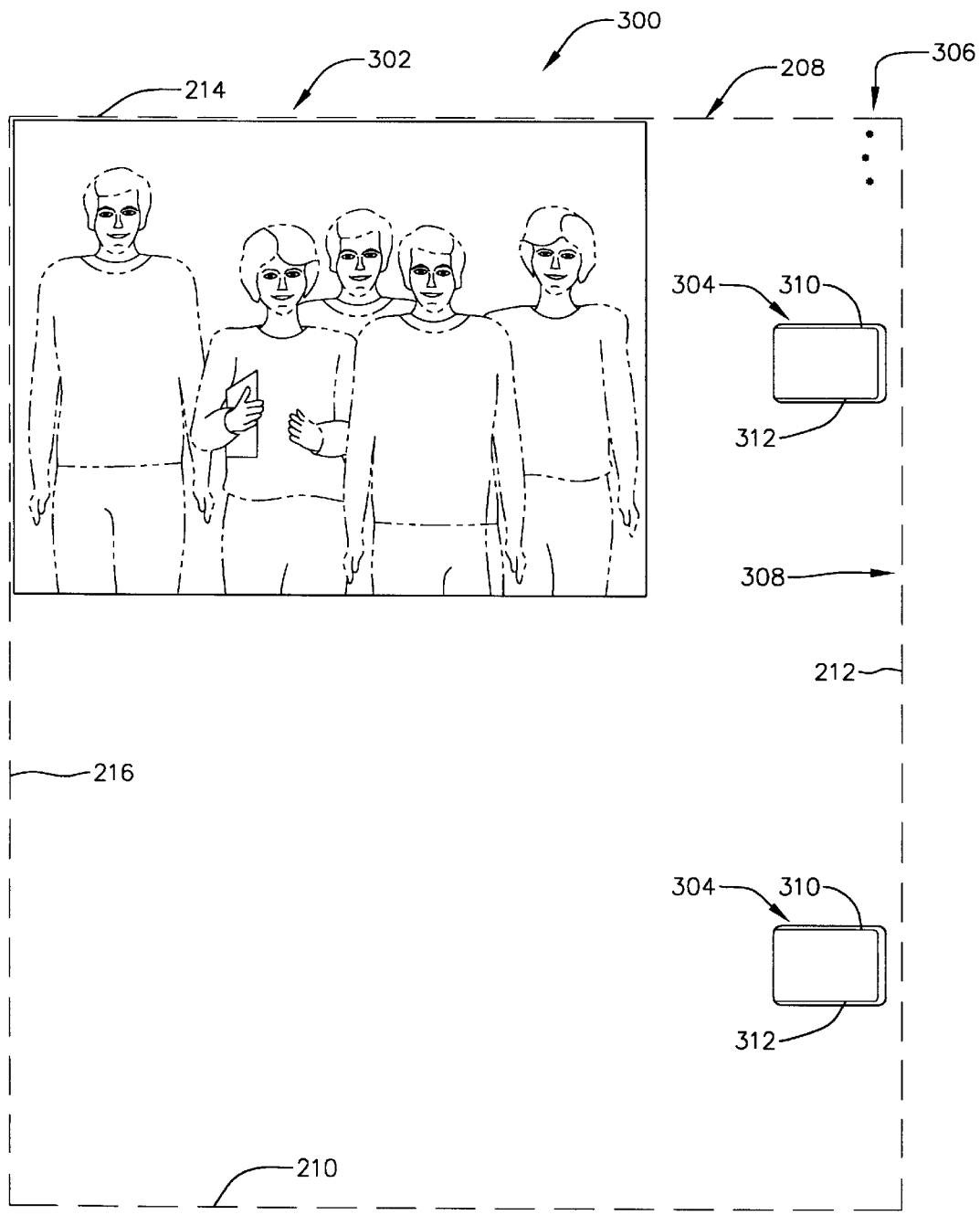
FIG. 3 shows a resulting image from a conventional flat bed scanner with an ADF where the object scanned is not positioned beneath the roller of the ADF.

FIG. 3 shows a resulting image 300 from a conventional flat bed scanner with an ADF where the object scanned is not positioned beneath the rollers of the ADF. The edges 210, 212, 214 and 216 of the scannable area 208 are shown (in phantom lines) bordering the resulting image 300. A scanned object image 302 is shown in the corner of the scannable area 208 defined by the edges 214 and 216. Two roller image artifacts 304 are shown adjacent to the back edge 212. Additional image artifacts are also present in the image 300, namely, a fiducial markers artifact 306 near the corner of the scannable area 208 defined by the edges 212 and 214 and a margin or edge artifact 308 adjacent to the back edge 212.

Figure 4:
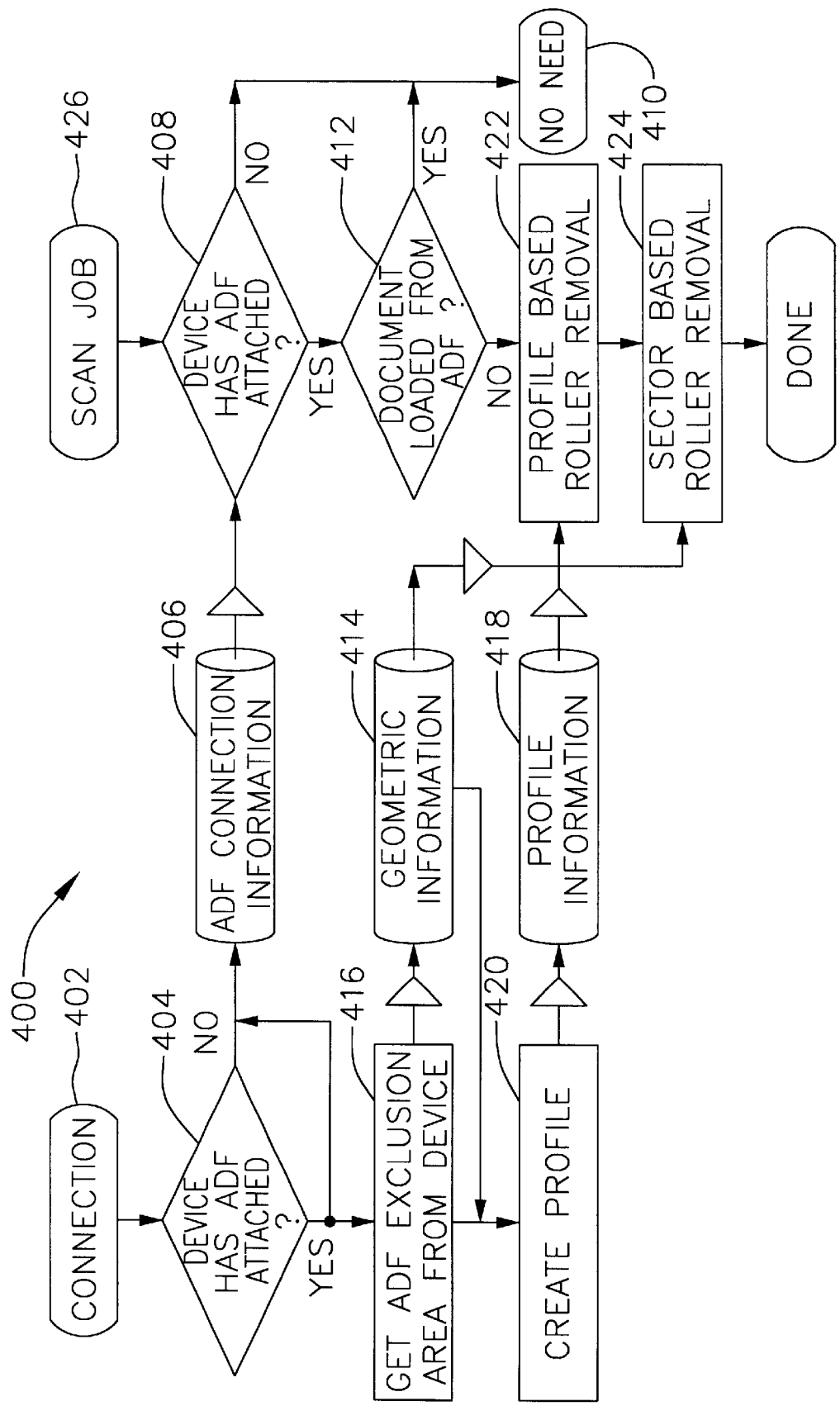
FIG. 4 is a flowchart showing an automatic artifact removal process according to an exemplary preferred embodiment of the present invention, the process including a profile-based roller removal process and a sector-based roller removal process.

Referring to FIG. 4, an exemplary preferred automatic artifact removal process 400 is embodied in a software program executed by the computer 102. At step 402, connection information from the scanner 104 is accessed. At decisional diamond 404, the output of a conventional sensor or the like (not shown) is analyzed to determine whether the ADF 204 is attached to the scanner 104. Next, ADF connection information 406 is provided to the computer 102. If the ADF 204 is not connected, a decisional diamond 408 directs execution of the software program to step 410 so that further processing pertaining to roller image artifact removal will be bypassed. Similarly, if it is determined at decisional diamond 412 that the scanned object was loaded from the ADF 204, the executable program is directed to step 410 because the ADF 204 is designed to position the object to be scanned in the scannable area 208 beneath the rollers 224. Otherwise, the ADF 204 would not be able to retract the object after the object has been scanned.

When the ADF 204 is attached to the scanner 104, geometric information 414 pertaining to the positions and sizes of known, potential image artifacts within the scannable area 208 of that particular scanner 104 are created and/or accessed at executable step 416. Next, profile information 418 pertaining to the known, potential image artifacts of that particular scanner 104 is created and/or accessed at executable step 420. The profile information 418 includes information which is created, for example, by scanning the roller 224 or other source of image artifact multiple times, processing (e.g., averaging) the scan data and storing the results in a memory device accessible to the computer 102 and/or the scanner 104. In an exemplary preferred embodiment, the geometric information 416 and/or the profile information 418 are stored in the firmware 120.

The exemplary preferred automatic artifact removal process 400 also includes a profile-based roller removal step 422 and a sector-based roller removal step 424 which receive and process the geometric information 416, the profile information 418, and image data 426 pertaining to an object scanned by the scanner 104. Generally, the profile-based roller removal processing step 422 employs data profiles of idealized artifact images to identify whole image artifacts within known or predetermined regions where it is possible for an image artifact to be present (hereinafter "known regions").

Figure 5C:
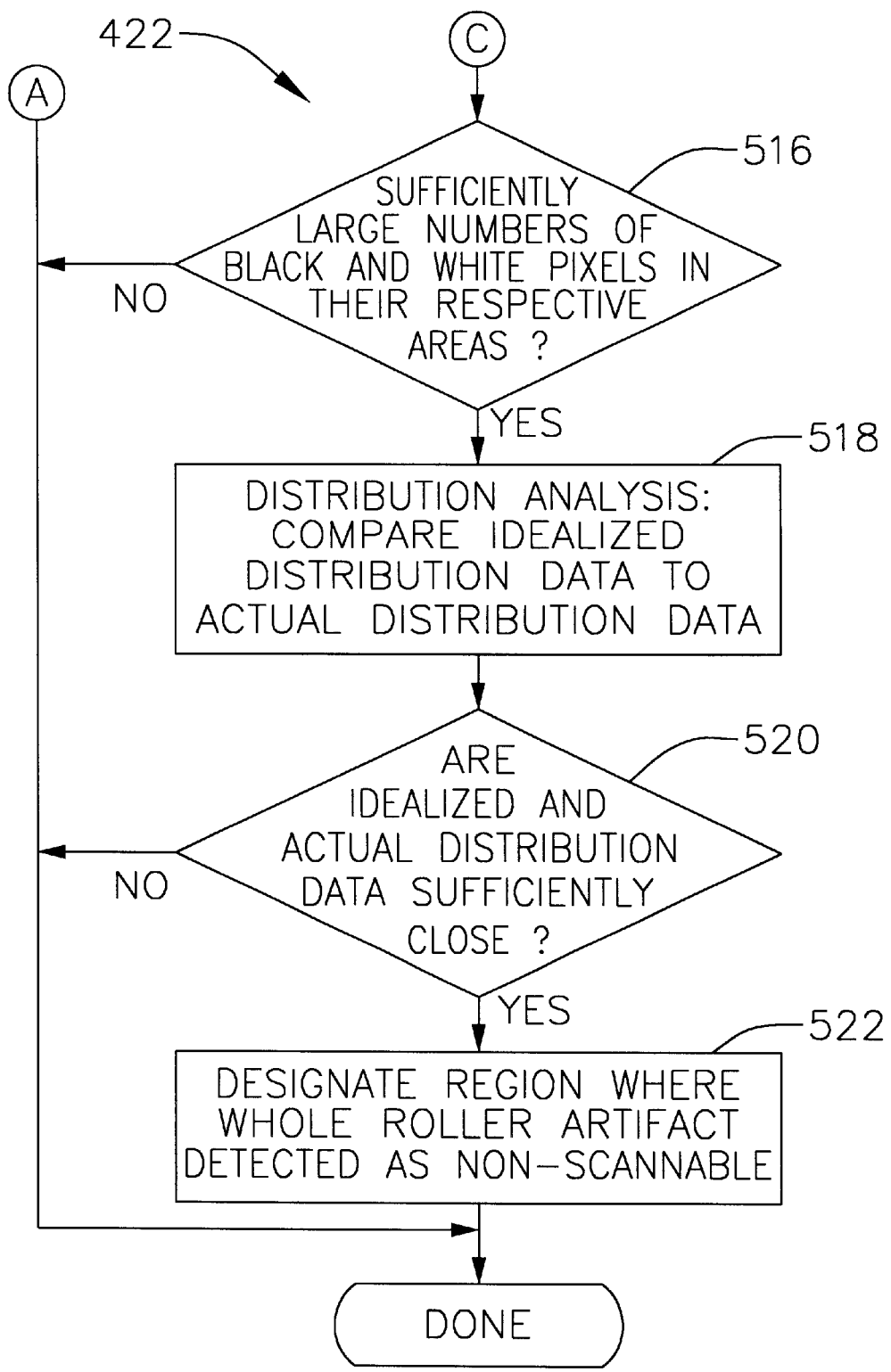

Referring to FIGS. 5A–5C, the profile-based roller removal processing step 422 begins with receiving the image data 426, which includes color characteristics for each pixel within the scannable area 208 (or at least for the image pixels corresponding to the known regions). The color characteristics for each pixel include hue and chromisity (or saturation). Since different colors have different hue and saturation values, the color characteristics of the pixels in the known regions are analyzed to determine whether there is a good likelihood of a roller artifact being present within the known regions.

A first gross comparison step 502 of the profile-based roller removal processing step 422 is conceptually illustrated in FIG. 6 which shows a color wheel 600. Saturation is plotted radially as shown by arrow 602. Hue is plotted circumferentially as shown by arrow 604. A yellowish color region 606 and a bluish color region 608 are shown with dashed lines inside the color wheel 600. Since the roller 224 is known to have a yellowish color, pixels in a region where the roller 224 is present would be clustered inside and/or near the yellowish color region 606. Thus, if pixels in a known region are mostly clustered outside the yellowish color region 606, for example, inside and/or near the bluish color region 608 (which is on the opposite side of the color wheel 600 from the yellowish color region 606), there is a low likelihood of a roller artifact being present in that particular known region.

Accordingly, and referring back to FIGS. 5A–5C, if the executable program at decisional diamond 504 determines that there is a sufficiently large number of non-roller colored pixels in a known region, further processing steps within the profile-based roller removal processing step 422 are bypassed and the executable program advances to the sector-based roller removal processing step 424 (FIG. 4). If there is not a sufficiently large number of non-roller colored pixels in a known region, there is still a likelihood of a roller artifact being present in the known region and the executable program advances to an executable step 506 where the image data 426 is simplified and a luminance for each pixel of interest is determined.

An exemplary preferred executable step 506 first involves converting the color image data 426 to gray scale data (e.g., 24-bit to 8-bit) and then determining a luminance (Y) for the pixels in the known regions. Luminance (Y) is preferably calculated as follows:

$$Y=0.300078125*R+0.5859375*G+0.11328125*B,$$

where g, r and b are green, red and blue, respectively. An alternative way to calculate luminance (Y) is:

$$Y = (g+r+b)/3$$

where g, r and b are green, red and blue, respectively. Still another way to calculate luminance (Y) is according to the Commission International de L'Éclairage ("CIE") definition of "CIE luminance" which is the radiant power weighted by a spectral sensitivity function that is characteristic of vision. Some formats of video data, e.g., JPEG, already include luminance information.

Referring to FIG. 5B, the executable program now advances to an edge detection step 508 where data pertaining to detected edges within the known areas is compared to idealized edge information pertaining to a known image artifact. The idealized edge information is part of the profile information 418 discussed supra.

When a roller artifact is present, edges 310 and 312 (FIG. 3) are typically visible. According to an exemplary preferred edge detection step 508, the idealized edge information is compared to the image data 426 pertaining to detected edges, if any. More specifically, the edge detection step 508 identifies black pixels of the detected edges which match black pixels of the idealized edge information. An exemplary preferred edge detection step 508 employs a conventional rastar edge detection algorithm. If it is determined at executable diamond 510 that there is not a sufficiently large number of matching pixels, e.g., 80% match, between the detected edges and the idealized edges, further processing steps within the profile-based roller removal processing step 422 are bypassed and the executable program advances to the sector-based roller removal processing step 424 (FIG. 4). If there is a sufficiently large number of matching pixels, there is still a likelihood of a roller artifact being present in the known region and the executable program advances to an executable step 512 where the image data 426 is converted to 1-bit data.

Next, the executable program advances to an area analysis step 514 where the image data 426 (1-bit) within at least one portion of a known region is analyzed to determine whether a sufficiently large number of pixels of a particular type are present within the at least one portion. An exemplary preferred area analysis step 514 is conceptually illustrated in FIG. 7 which shows a known region 700 within which it is possible for a roller artifact to be present. The known region 700 includes a perimeter 702 and area boundaries 704 and 706 (shown in dashed lines). A black pixel area 708 is bounded by the perimeter 702 and the area boundary 704. A white pixel area 710 is bounded by the area boundary 706. If it is determined at decisional diamond 516 that there are not a sufficiently large number of black and white pixels in the black pixel area 708 and in the white pixel area 710, respectively, further processing steps within the profile-based roller removal processing step 422 are bypassed and the executable program advances to the sector-based roller removal processing step 424 (FIG. 4). If there is a sufficiently large number of black and white pixels in the black pixel area 708 and in the white pixel area 710, respectively, there is still a likelihood of a roller artifact being present in the known region and the executable program advances to a distribution analysis step 518 where the image data 426 is analyzed to determine whether a distribution of a characteristic of the image data 426 for a known region is sufficiently close to a distribution of the same characteristic of an idealized image artifact for the known region.

An exemplary preferred distribution analysis step 518 is conceptually illustrated in FIG. 8 which is a graph 800 of an idealized distribution signature 802 and an actual distribution signature 804 for a known region or part of it. The idealized and actual distribution signatures 802, 804 are plots of the number of pixels within the known region (y-axis) for each gray scale value from white to black (x-axis). The idealized distribution signature 802 is also part of the profile information 418 discussed supra.

Referring to FIG. 5C, if it is determined at decisional diamond 520 that the idealized distribution signature 802 and the actual distribution signature 804 are not sufficiently close, further processing steps within the profile-based roller removal processing step 422 are bypassed and the executable program advances to the sector-based roller removal processing step 424 (FIG. 4). If the idealized distribution signature 802 and the actual distribution signature 804 are sufficiently close, the executable program advances to step 522 where the known region under analysis is designated as a region where a whole roller artifact has been detected, and pixels within the scannable area 208 corresponding to that region are treated as non-scannable. The processor 102 is controlled to exclude such a known region from the scannable area 208.

Referring to FIG. 4, in the sector-based roller removal processing step 424, portions of the image data 426 corresponding to sectors within the known regions are analyzed to identify partial image artifacts within the known regions.

FIG. 9A shows a region 900 within which it is possible for a roller artifact (whole or partial) to be present. According to an exemplary preferred sector-based roller removal processing step 424, the region 900 is partitioned into five sectors 902, 904, 906, 908 and 910 arranged as shown. When an object to be scanned only covers, for example, the region 908, it would not desirable to exclude the entire region 900 from the scannable area 208. Accordingly, the sector-based roller removal processing step 424 essentially repeats the profile-based roller removal processing step 422 for each of the sectors 902, 904, 906, 908 and 910, but modified in consideration of the idealized information particular to each sector. FIGS. 9B and 9C illustrate alternative sector configurations for the sector-based roller removal processing step 424. FIG. 9B shows a region 920 which has been partitioned for processing purposes into four sectors 922, 924, 926 and 928. FIG. 9C shows a region 940 which has been partitioned for processing purposes into nine sectors 942, 944, 946, 948, 950, 952, 954, 956 and 958. It should be understood that other partitioning approaches are possible depending upon the nature, size, location and other characteristics of a particular known artifact.

Thus, the processor 102 is controlled to exclude known regions or portions of the regions (sectors) from the scannable area 208, to treat such excluded portions as white background, and to generate a color image from the elements of the image data 426 pertaining only to the portions of the scannable area 208 for which no image artifacts are determined to be present.

Although the present inventions have been described in terms of the preferred embodiment above, numerous modifications and/or additions to the above-described preferred embodiment would be readily apparent to one skilled in the art. It is intended that the scope of the present inventions extend to all such modifications and/or additions.

We claim:

1. A method for automatic removal of image artifacts, comprising the steps of:

receiving image data pertaining to a known region of a scannable area where an image artifact may be present;

processing the image data to determine whether the image artifact is present within the known region; and when an image artifact is present in the known region, controlling a processor to exclude the known region from the scannable area;

wherein the processing step comprises a profile-based processing step where data profiles of idealized artifact images are employed to identify whole image artifacts within the known regions.

2. A method as claimed in claim 1, wherein the scannable area is on a flat bed scanner.

3. A method as claimed in claim 1, wherein the image artifact is a roller image.

4. A method as claimed in claim 1, wherein the image artifact is an edge image.

5. A method as claimed in claim 1, wherein the image artifact is a fiducial marker image.

6. A method as claimed in claim 1, wherein the processing step further comprises a sector-based processing step where portions of the image data corresponding to sectors within the known regions are analyzed to identify a partial image artifact within the known regions.

7. A method as claimed in claim 1, wherein the processing step comprises evaluating a color characteristic of the image data.

8. A method as claimed in claim 7, wherein the color characteristic is hue.

9. A method as claimed in claim 7, wherein the color characteristic is chromisity or saturation.

10. A method as claimed in claim 7, wherein the color characteristic is luminance.

11. A method for automatic removal of image artifacts, comprising the steps of:
receiving image data pertaining to a known region of a scannable area where an image artifact may be present;
processing the image data to determine whether the image artifact is present within the known region; and
when an image artifact is present in the known region, controlling a processor to exclude the known region from the scannable area;
wherein the processing step employs an edge detection analysis to compare detected edges within the known area to idealized edge information pertaining to a known image artifact.

12. A method as claimed in claim 11 wherein the edge detection analysis employs a rastar edge detection algorithm.

13. A method as claimed in claim 11, wherein the processing step comprises evaluating a color characteristic of the image data.

14. A method as claimed in claim 13, wherein the color characteristic is hue.

15. A method as claimed in claim 13, wherein the color characteristic is chromisity or saturation.

16. A method as claimed in claim 13, wherein the color characteristic is luminance.

17. A method as claimed in claim 11, wherein the scannable area is on a flat bed scanner.

18. A method as claimed in claim 11, wherein the image artifact is a roller image.

19. A method as claimed in claim 11, wherein the image artifact is an edge image.

20. A method as claimed in claim 11, wherein the image artifact is a fiducial marker image.

21. A method for automatic removal of image artifacts, comprising the steps of:
receiving image data pertaining to a known region of a scannable area where an image artifact may be present;
processing the image data to determine whether the image artifact is present within the known region; and
when an image artifact is present in the known region, controlling a processor to exclude the known region from the scannable area;
wherein the processing step comprises an area analysis of the image data within at least one portion of the known region to determine whether a sufficiently large number of pixels of a particular type are present within the at least one portion.

22. A method as claimed in claim 21, wherein the processing step comprises evaluating a color characteristic of the image data.

23. A method as claimed in claim 22, wherein the color characteristic is hue.

24. A method as claimed in claim 22, wherein the color characteristic is chromisity or saturation.

25. A method as claimed in claim 22, wherein the color characteristic is luminance.

26. A method as claimed in claim 21, wherein the scannable area is on a flat bed scanner.

27. A method as claimed in claim 21, wherein the image artifact is a roller image.

28. A method as claimed in claim 21, wherein the image artifact is an edge image.

29. A method as claimed in claim 21, wherein the image artifact is a fiducial marker image.

30. A method for automatic removal of image artifacts, comprising the steps of:
receiving image data pertaining to a known region of a scannable area where an image artifact may be present;
processing the image data to determine whether the image artifact is present within the known region; and
when an image artifact is present in the known region, controlling a processor to exclude the known region from the scannable area;
wherein the processing step comprises a distribution analysis of the image data to determine whether a distribution of a characteristic of the image data over the known region is sufficiently close to an idealized characteristic distribution for an idealized image artifact.

31. A method as claimed in claim 30, wherein the characteristic is a gray-scale value of the image data.

32. A method as claimed in claim 30, wherein the processing step comprises evaluating a color characteristic of the image data.

33. A method as claimed in claim 32, wherein the color characteristic is hue.

34. A method as claimed in claim 32, wherein the color characteristic is chromisity or saturation.

35. A method as claimed in claim 32, wherein the color characteristic is luminance.

36. A method as claimed in claim 30, wherein the scannable area is on a flat bed scanner.

37. A method as claimed in claim 30, wherein the image artifact is a roller image.

38. A method as claimed in claim 30, wherein the image artifact is an edge image.

39. A method as claimed in claim 30, wherein the image artifact is a fiducial marker image.

* * * * *